United States Patent [19]

Oklobdzija

[11] Patent Number: 4,847,759
[45] Date of Patent: Jul. 11, 1989

[54] REGISTER SELECTION MECHANISM AND ORGANIZATION OF AN INSTRUCTION PREFETCH BUFFER

[75] Inventor: Vojin G. Oklobdzija, Carmel, N.Y.

[73] Assignee: International Business Machines Corp., Armonk, N.Y.

[21] Appl. No.: 237,615

[22] Filed: Aug. 4, 1987

Related U.S. Application Data

[63] Continuation of Ser. No. 713,217, Mar. 18, 1985, abandoned.

[51] Int. Cl.[4] .......................... G06F 13/00; G11C 8/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,739,352 | 6/1973 | Packard | 364/200 |
| 4,070,657 | 1/1978 | Fett | 365/179 |
| 4,135,242 | 1/1979 | Ward et al. | 364/200 |
| 4,219,874 | 8/1980 | Gusev et al. | 364/200 |
| 4,309,754 | 1/1982 | Dinwiddie | 364/200 |
| 4,347,567 | 8/1982 | Detar et al. | 364/200 |
| 4,375,665 | 3/1983 | Schmidt | 364/200 |
| 4,443,846 | 4/1984 | Adcock | 364/200 |
| 4,447,878 | 5/1984 | Kinnie et al. | 364/200 |
| 4,489,395 | 12/1984 | Sato | 364/900 |
| 4,569,018 | 2/1986 | Hummel et al. | 364/200 |

OTHER PUBLICATIONS

*Principles of Digital Computer Design*, by Abd-Alla et al., Copyright 1976, pp. 196-203.

Primary Examiner—Gary V. Harkcom
Assistant Examiner—Lawrence E. Anderson
Attorney, Agent, or Firm—Whitham & Marhoefer

[57] ABSTRACT

A register selection mechanism for an instruction prefetch buffer which allows instructions having different lengths to be accessed on the instruction boundaries. The instruction prefetch buffer comprises a one-port-write, two-port-read array (10). Address generation and control logic (16) is responsive to a read pointer (15) for controlling access to odd and oven addresses in the array. Additional logic may be provided to provide an indication that the instruction prefetch buffer is empty.

5 Claims, 3 Drawing Sheets

FIG.1A

| OP CODE | REG. X | REG. Y | IMMEDIATE |
|---|---|---|---|
0              7      11     15                              31

| OP CODE | REG. X | REG. Y |
|---|---|---|
0              7      11     15

| OP CODE | BRANCH ADDRESS |
|---|---|
0              7                                              31

| OP CODE | REG.X | BRANCH IMMEDIATE FIELD |
|---|---|---|
0              7      11                                     31

4,847,759

REGISTER SELECTION MECHANISM AND ORGANIZATION OF AN INSTRUCTION PREFETCH BUFFER

CROSS-REFERENCE TO RELATED APPLICATION

This application is a continuation of application Ser. No. 06/713,217 filed Mar. 18, 1985, now abandoned.

BACKGROUND OF THE INVENTION

The subject invention is related to instruction prefetch buffers for microprocessors and, more particularly, to a register selection mechanism which enables instruction access on instruction boundaries when used with a microprocessor that operates with variable length instructions.

Single chip integrated circuit (IC) icroprocessors are of course well known in the art. These devices have been developed over the past decade from the relatively simple to the very complex. Early examples were limited to 4-bit devices while currently 32-bit devices are being introduced by various manufacturers. Along with an increase in scale, there has been a corresponding increase in sophistication of design to permit greater flexibility in programming. In one specific example, a microprocessor has been developed which operates with variable length instructions. These instructions may be either 32 bits in length or 16 bits in length. It is necessary in order to properly decode the operation codes and operands of the instruction fields that they be accessed on their boundaries. In a specific implementation of the microprocessor, the instruction prefetch buffer comprises four registers. The organization of these registers requires eight inputs to the multiplexers used for the extraction of the operation codes and the operand fields. Because of the lack of space on the microprocessor chip, it is not possible to implement a larger size instruction prefetch buffer because of the number of multiplexer inputs and the overhead required for the wiring.

SUMMARY OF THE INVENTION

It is therefore an object of the present invention to provide a register selection mechanism and organization which allows a larger instruction prefetch buffer in an integrated circuit microprocessor without requiring a large amount of space on the chip.

It is another object of the invention to provide an improved extraction mechanism for obtaining the next instruction aligned on the instruction boundary which eliminates the need for extensive multiplexing.

It is a further object of the present invention to provide an instruction prefetch buffer where instructions fetched from the buffer are aligned on the instruction fields thereby avoiding the use of large and area expensive instruction field multiplexers.

According to the invention, the instruction prefetch buffer is organized as a one-port-write, two-port-read memory array. Means are responsive to a read pointer for controlling access to odd and even addresses in an array of the buffer. Address generation means are responsive to the control means for generating addresses for accessing the array.

BRIEF DESCRIPTION OF THE DRAWINGS

The foregoing and other objects, aspects and advantages of the invention will be better understood from the following detailed description of the invention, in which:

FIG. 1A illustrates examples of instruction formats having different lengths.

DETAILED DESCRIPTION OF THE INVENTION

Figure 1:
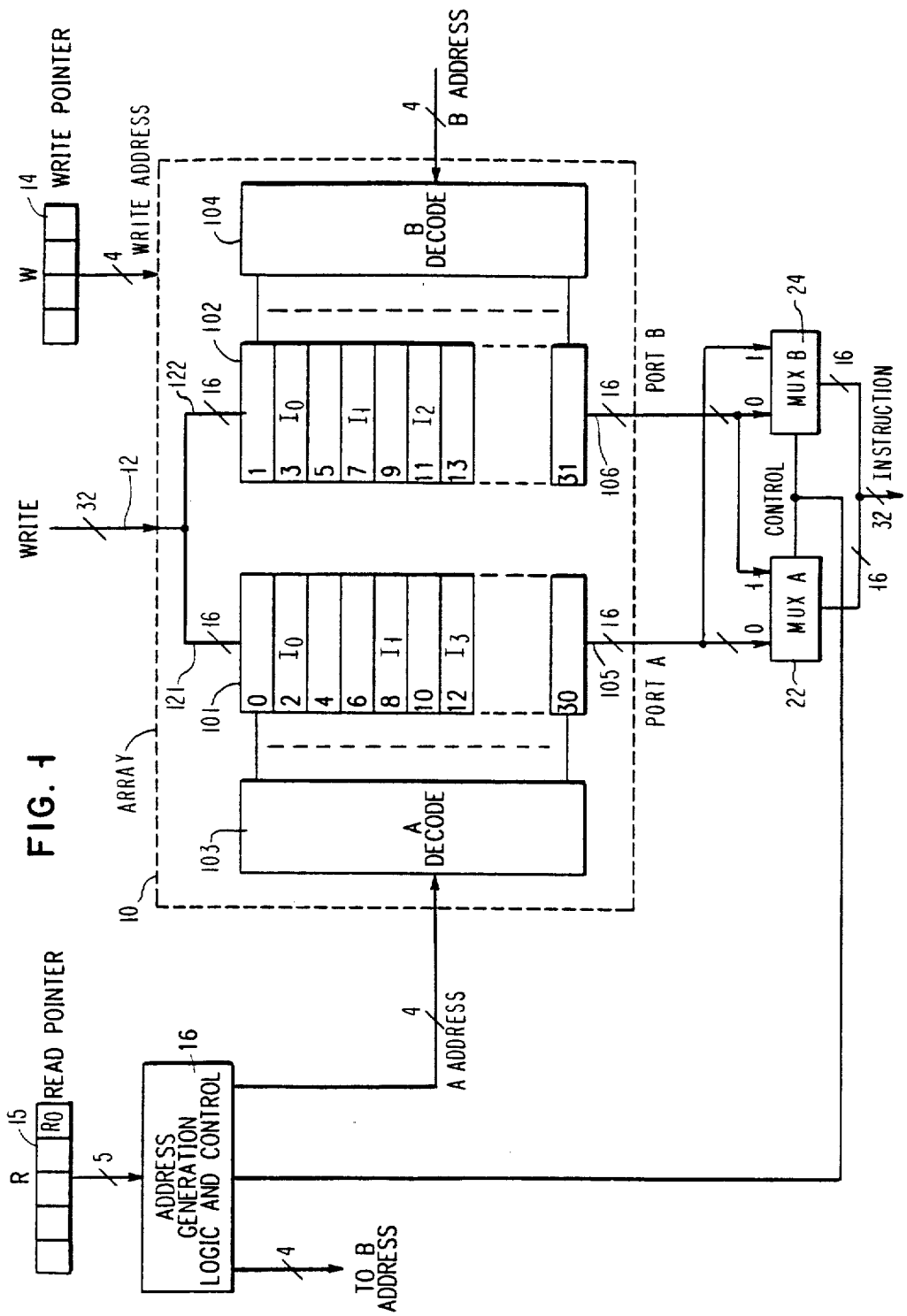
FIG. 1 is a block diagram showing the overall organization of the instruction prefetch buffer according to the invention.

In the specific implementation of the invention as shown in FIG. 1 of the drawings, the instruction prefetch buffer is implemented as a 32-bit one-port-write and 16-bit two-port-read array 10. More specifically, the array 10 comprises an even array 101, referred to herein as the A array, and an odd array 102, referred to herein as the B array. Associated with the A array 101 is an address decoding network 103. A corresponding address decoding network 104 is associated with the B array 102. The A array 101 is addressed with even address values, while the B array 102 is addressed with odd address values. Each array 101 and 102 is shown as capable of storing 16 half words (16 bits) for a total of 32 half words, but those skilled in the art will understand that this is but one specific example. The principles of the invention are equally applicable to larger or smaller arrays and could be extended to byte fields (8 bits) and double word fields (64 bits).

As indicated in FIG. 1, instruction $I_0$ is a 32-bit instruction beginning at an even address in the A array 101 and continuing over to an odd address in the B array 102. Instruction $I_1$ is another 32-bit instruction, but this instruction begins at an odd address in the B array 102 and continues to an even address in the A array 101. Instruction $I_2$ is an example of a 16-bit instruction which begins at an odd address and is totally contained in the B array 102, while instruction $I_3$ is another 16-bit instruction which begins at an even address and is totally contained in the A array 101. FIG. 1A shows examples of instruction formats which may be used. In each of these formats, the first eight bits or byte contains the operation code. The next four bits of the top two formats specifies a register denoted here as the X register, while the following four bits specifies a register denoted here as the Y register. That is the total content of the second format shown in FIG. 1A, this format being an example of a 16-bit or half word instruction. The first format, however, is a 32-bit or word instruction and contains a 16-bit operand address, here denoted as "immediate". Two other examples of 32-bit or word instructions are also shown in FIG. 1A. In one of these there is 24-bit branch address, while in the other a 20-bit branch immediate field address follows a 4-bit register number. What should be understood is that one word (32-bits) is fetched at a time from the main memory and written into the prefetch buffer. Since different length instructions are used, an instruction can be anywhere within 2-byte boundaries, and the problem is to extract the instructions one at a time however they might be distributed within the boundaries of the prefetch buffer.

A 32-bit write bus 12 from main memory is split into two 16-bit buses 121 and 122 in the array 10 with bus 121 supplying the A array 101 with the first two bytes of the word fetched from the memory to be written in that array and bus 122 supplying the B array 102 with the second two bytes of the same word to be written in that array. Register 14 temporarily stores the write pointer W which points to the 32-bit location where a new word is to be written. The 32-bit location is obtained by combining both 16-bit registers A and B from the array 10 and addressing them as one 32-bit register. Thus, write address $W_0$ addresses the A array address $A_0$ and the B array address $B_1$ and so forth. Therefore, the W pointer is only four bits long.

Register 15 temporarily stores the read pointer R which points to the 32-bit location from where the instruction is to be read. The 5-bit R pointer is supplied to the address generation and control logic 16. This logic generates the 4-bit addresses for each of the arrays 101. Specifically, the 4-bit A address is supplied to the A decoder 103 and the 4-bit B address is supplied to the B decoder 104. The output of the A array 101 is supplied via a first 16-bit output bus 105 to port A, and the output of the B array 102 is supplied via a second 16-bit output bus 106 to port B.

In order to have the instruction read out of the array 10 aligned, the beginning of the instruction has always to be read from the multiplexer 22 whether the instruction is a 16-bit instruction or a 32-bit instruction. Also, to access a 32-bit instruction from the array, both sides of the array, odd and even, have to be addressed and data brought to ports A and B. But as already described, a 16-bit portion containing the beginning of the instruction may be either in the A array 101 or the B array 102; i.e., 32-bit instructions can start in either array. Therefore, multiplexers 22 and 24 are provided to read the instructions out of the array 10 in the proper order. The two 16-bit inputs of each multiplexer 22 and 24 are each connected to the 16-bit ports A and B of the array 10 but in the opposite order from each other. The 16-bit outputs of the multiplexers 22 and 24 are combined to provide a 32-bit instruction output. In the case of a 16-bit instruction, the high order 16 bits comprise a null field and are simply disregarded.

Figure 2:
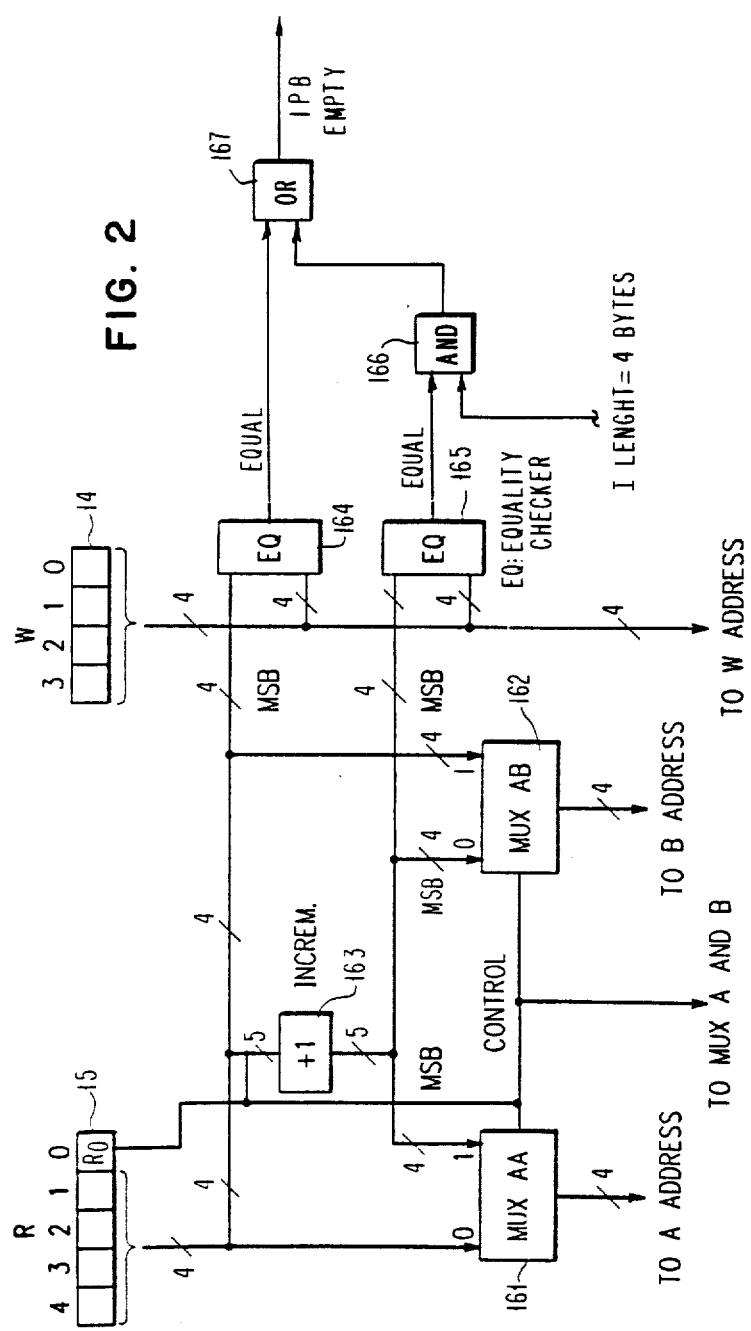
FIG. 2 is a block and logic diagram of the address generation and control logic used in the instruction prefetch buffer shown in FIG. 1.

The address generation and control logic 16 is shown in more detail in FIG. 2. The four most significant bits (MSB) of the R pointer register 15 are first of all supplied to opposite inputs of multiplexers 161 and 162. In the case of a full word instruction, it will be understood that the address of the second half of the instruction is equal to the address of the first half plus one. Therefore, all five bits of the R pointer register 15 are supplied to an incrementer 163 which adds one to the R pointer. The four MSB from the incrementer are then supplied to the remaining inputs of the multiplexers 161 and 162. The least significant bit (LSB) $R_0$ of the R pointer is used to control multiplexers 161 and 162. The outputs of these multiplexers are the A and B addresses, respectively. $R_0$ therefore properly controls the selection of the two halves of a full word instruction irrespective of which array A or B the two halves are stored. Only the four MSBs are fed to the address multiplexers 161 and 162 since they address 16 registers in the A or B arrays 101 and 102 as determined by $R_0$. $R_0$ is also used to control the multiplexers 22 and 24. Thus, if $R_0=0$, the instruction starts in the A array and is aligned on the outputs of the array 10. On the other hand, if $R_0=1$, the instruction starts in array B and the two 16-bit outputs from array 10 have to be reversed in order for the instruction to be aligned.

Additional logic is associated with the W pointer register 14 and is used to indicate when the instruction prefetch buffer is empty. Specifically, equality checkers 164 and 165 each receive the four bits from register 14. Equality checker 164 in addition recieves the four MSBs from register 15, while equality checker 165 receives the four MSBs from incrementer 163. The equality checkers may be implemented with exclusive OR gates and a NOR gate. The output of equality checker 165 is supplied to one input of AND gate 166 the second input of which is enabled whenever the instruction length is four bytes long; i.e., a 32-bit instruction as opposed to a 16-bit instruction for the specific example being described. The output of AND gate 166 and the output of equality checker 164 are connected to the inputs of OR gate 167 which provides an output indicating that the instruction prefetch buffer is empty. In other words, the instruction prefetch buffer is empty whenever $W=R$ or $W=R+1$ and the instruction is a full word.

It is important to note that the disclosed implementation does not require an array having special features. Instead, the array 10 can be implemented using two general purpose arrays containing 16 registers each of a microprocessor by organizing them as an array having one 32-bit write port and two 16-bit read ports. Moreover, as already stated, the specific sizes of the arrays and the registers within the arrays may be varied depending on the application. For example, it is altogether possible to provide an array of byte registers with four or even eight subarrays of such byte registers. The addressing of such an arrangement, while complex, is a straight forward application of the principles of the invention as described by way of specific example. Output multiplexers in such a case could be part of the subarray decoders all organized into the one array decoder. Those skilled in the art will therefore recognize that modifications can be made in the practice of the invention within the scope of the appended claims.

I claim:

1. An instruction prefetch buffer connected to an n-bit bus and an output n-bit bus comprising:

an array having one n-bit input write port and two m-bit output read ports where $n=2m$, said n-bit input port being connected to said input n-bit bus for receiving an n-bit, two m-bit or a mixture of portions of n-bit and m-bit instructions from a main memory for writing into said array and two m-bit output ports each providing respectively m-bits of an instruction read out of said array, said array storing a mixture of n-bit and m-bit instructions which start on m-bit address boundaries within said array;

a write pointer register for temporarily storing a first binary number which points to an n-bit location in said array where n bits from said main memory is to be written, said array being connected to said write pointer register and responsive to said first binary number for writing an instruction at said location; and address generation and control logic means connected to said array for accessing the instructions in said array on m-bit address boundaries within said array and providing m-bit instructions on the most significant bit lines of said output n-bit bus and combining two m-bit outputs from said two m-bit output ports in the proper order to form an n-bit instruction on said output bus.

2. An instruction prefetch buffer as recited in claim 1 wherein said array comprises first and second subarrays of m-bit registers, said first subarray storing instructions which are addressed with odd addresses and said second subarray storing instructions which are addressed with even addresses, said array further comprising odd address decoding means for decoding odd addresses for said first subarray and even address decoding means for decoding even addresses for said second subarray.

3. The instruction prefetch buffer as recited in claim 2 wherein said address generation and control logic means comprises:
   a read pointer register for temporarily storing a second binary number which points to an n-bit location in said array where an instruction is to be read;
   address generating means responsive to said second binary number in said read pointer register for generating odd and even addresses supplied, respectively, to said odd and even address decoding means; and
   multiplexer means connected to said two output ports of said array and controlled by the least significant bit of said binary number in said read pointer register for reversing the order of the output of said array or not, depending on whether an instruction begins at an even or odd address, respectively.

4. An instruction prefetch buffer as recited in claim 3 further comprising means responsive to said write and read pointer registers for providing an output indicating that said instruction prefetch buffer is empty, said means comprising:
   first equality detecting means connected to said write and read pointer registers for providing an output when addresses corresponding to said first and second binary numbers are equal;
   incrementing means connected to said read pointer register for adding one to said second binary number and providing an incremented output;
   second equality detecting means connected to said write pointer register and said incrementing means for providing an output when addresses corresponding to said first binary number and said incremented output are equal;
   an AND gate enabled when an instruction is an n-bit instruction and connected to provide as an output the output of said second equality detecting means when enabled; and
   an OR gate connected to the outputs of said first equality detecting means and said AND gate to provide an output indicative of said instruction prefetch buffer being empty.

5. An instruction prefetch buffer as recited in claim 3 wherein said address generating means comprises:
   incrementer means connected to said read pointer register for adding one to said second binary number to provide an incremented output; and
   first and second multiplexers each having first and second inputs and a single output, the output of said first multiplexer being connected to said odd address decoding means and the output of said second multiplexer being connected to said even address decoding means, said incremented ouput from said incrementer means being connected to the second and first inputs, respectively, of said first and second multiplexers, and said first and second inputs, respectively, of said first and second multiplexers being connected to said read pointer register, said first and second multiplexers being controlled by the least significant bit of said second binary number in said read pointer register to supply as their respective outputs their first or second inputs depending on whether the least significant bit is a binary zero or a binary one.

* * * * *